J. C. COLLINS.
INTERMITTENT MOTION FOR MOVING PICTURE MACHINES.
APPLICATION FILED APR. 19, 1912.
1,059,276.  Patented Apr. 15, 1913.
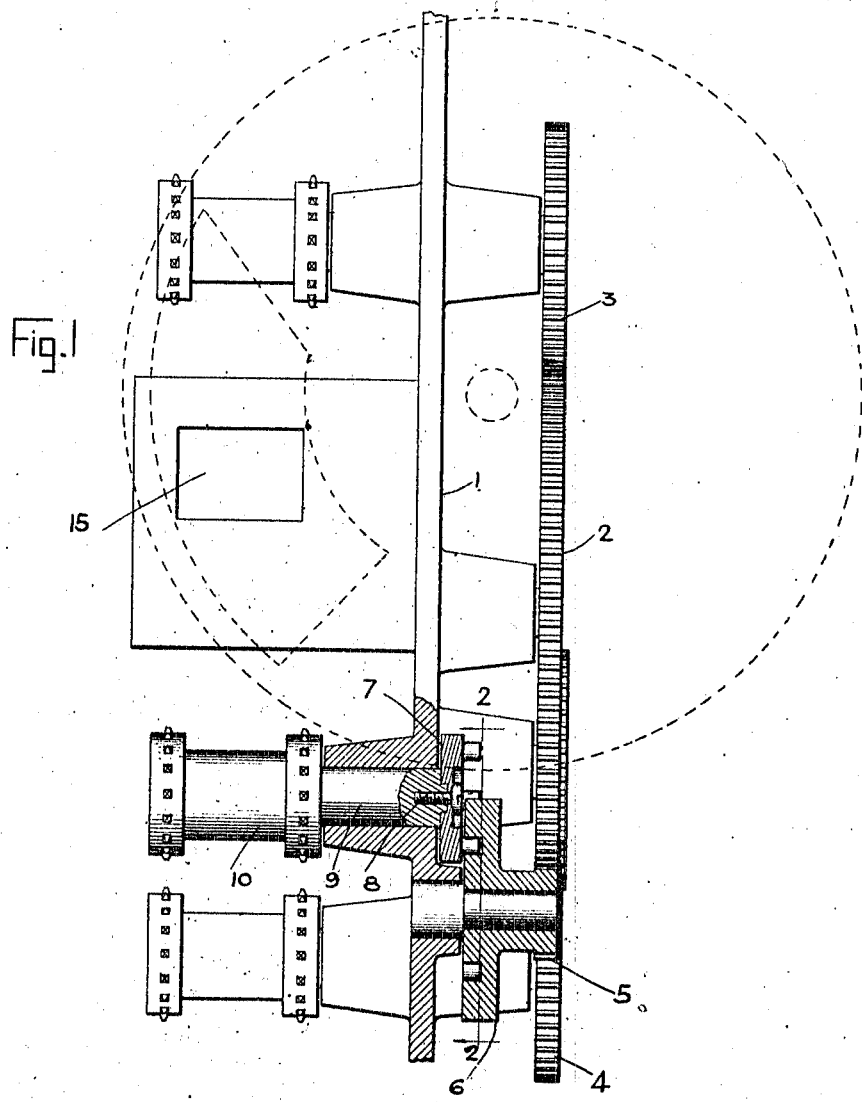
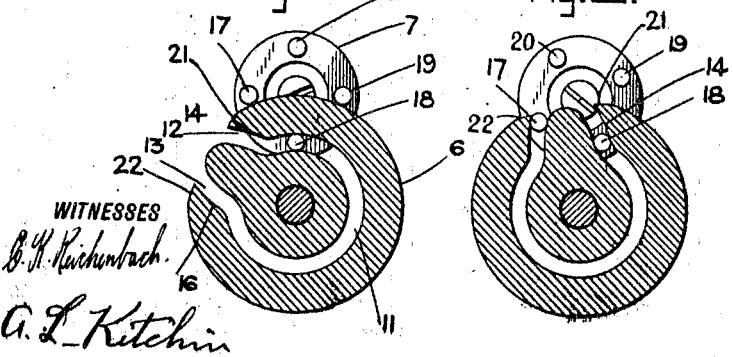
WITNESSES
B. K. Reichenbach
G. L. Kitchin
INVENTOR
John C. Collins
BY Munn & Co.
ATTORNEYS

UNITED STATES PATENT OFFICE.

JOHN C. COLLINS, OF NEW YORK, N. Y., ASSIGNOR OF ONE-HALF TO OTTO F. MILLER, OF NEW YORK, N. Y.

INTERMITTENT MOTION FOR MOVING-PICTURE MACHINES.

1,059,276.      Specification of Letters Patent.     Patented Apr. 15, 1913.

Application filed April 19, 1912. Serial No. 691,810.

*To all whom it may concern:*

Be it known that I, JOHN C. COLLINS, a citizen of the United States, and a resident of the city of New York, borough of Manhattan, in the county and State of New York, have invented a new and Improved Intermittent Motion for Moving-Picture Machines, of which the following is a full, clear, and exact description.

This invention relates to improvements in moving picture machines, and particularly to an intermittent motion mechanism therefor, and has for an object to provide an improved structure for operating the intermittent sprocket wheel.

Another object of the invention is to provide an operating wheel connected with the intermittent sprocket wheel of a moving picture machine arranged to co-act with a rotating cam member designed to successively engage pins projecting from the operating wheel so as to intermittently feed forward the intermittent sprocket wheel, the cam member continuously moving.

In carrying out the objects of the invention, a moving picture machine of any desired construction may be provided, having the usual feeding and take up sprocket wheels, and also the intermittent wheel.

Connected with the intermittent sprocket wheel so as to operate the same in timed relationship to the remaining sprocket wheels, is an intermittent feed or drive mechanism forming the subject matter of the invention and comprising a wheel having a plurality of pins or projections extending therefrom co-acting with a continuously rotating cam member wheel. The continuously rotating cam member is connected with the usual gearing designed to drive the feed sprocket and take up sprocket so as to rotate at such a speed as to cause a complete rotation of the intermittent sprocket for each complete rotation of either of the remaining sprockets said rotation, however, being by intermittent motions.

A practical embodiment of the invention is represented in the accompanying drawings forming a part of this specification, in which similar characters of reference indicate corresponding parts in all the views.

Figure 1 is a fragmentary view partially in section of a moving picture machine showing an embodiment of the invention applied thereto, said embodiment being shown also in section; Fig. 2 is a fragmentary sectional view through Fig. 1 approximately on the line 2—2; and Fig. 3 is a view similar to Fig. 2, except that the part is shown in a different position.

Referring to the accompanying drawings by numerals, 1 indicates a suitable framework of any desired kind arranged to carry the main driving gear 2 and the gears 3 and 4 connected with the feed sprocket and take up sprocket wheels. The main driving gear 2 is arranged so as to mesh with a pinion 5 formed integral with or rigidly secured to a cam wheel 6. The cam wheel 6 is arranged to act upon an intermittent driving element 7 rigidly secured, as for instance by a screw 8, to the shaft 9 of the intermittent sprocket 10.

The construction and operation of the cam wheel 6 and the intermittent driving element 7 may be seen more clearly from Figs. 2 and 3 wherein it will be noted that the cam wheel 6 is provided with an annular groove 11 merging into grooves or passageways 12 and 13. Arranged on one side of the passageway 12 is a wall 14 which acts as a cam when the machine is being properly operated for moving the film past the window 15. If for any reason the machine should be operated backward the cam face 16 would operate in a reverse direction to the cam face or wall 14 for engaging the respective pins 17, 18, 19, and 20. In the drawings only four pins are shown on the intermittent driving element 7 as the cam wheel 6 is geared at a ratio of four to one in respect to the driving element 7. If a greater or less number of pins was found desirable the same could be provided and a proper change in the ratio of revolutions of the cam wheel 6 could be made. In the construction shown the cam wheel 6 is adapted to rotate four times to one rotation of the intermittent driving element 7 and consequently four times to one revolution of the intermittent sprocket 10.

In operating the device it will be evident that the point 21 will engage the pin 18 for instance, which will result in the cam face 14 pressing against the pin 18 for causing the same to move toward the position shown in Fig. 2 from the position shown in Fig. 1. This movement will be comparatively quick and will give the intermittent driving element 7 and the intermittent sprocket 10 a one-fourth revolution. As soon as the pin 18 has moved to substantially the position shown in Fig. 2, the intermittent driving element 7 and the intermittent sprocket 10 will remain stationary, while the cam wheel 6 will continue to rotate until the same has made a substantially complete revolution. On the completing of the revolution of the cam wheel 6, the pin 18 will move out through the passageway 13, as shown by the position of the pin 17 in Fig. 3 at the same time that pin 19 moves through the passageway 12 into the annular channel 11. From this it will be seen that there is only one pin in the channel 11 at a time as one pin is discharged upon the movement of the other pin by the cam face 14.

In order to positively cause a proper passing of the channel 11 past the pin 17 when the pin 18 is being forced into the annular groove 11, the outer surface of the cam wheel 6 is beveled at 21, as more clearly shown in Fig. 2. A similar bevel 22 is provided adjacent the passageway 13 so as to cause a proper operation when the machine is being moved in a reverse direction. It will be noted that by reason of the intergearing of the cam wheel 6 with the main drive gear 2 a continuous movement of the cam wheel 6 will result as long as the machine is in operation, which in turn will result in an intermittent movement of the sprocket wheel 10 in proper timed relationship to the movement of the feed sprocket and the take up sprocket. Also it will be observed that the movement of the intermittent sprocket 10 is caused by a positive drive and not by the tension of springs or other means which may vary the quickness of the movement of the sprocket.

This intermittent-motion device has been described in respect to a moving picture machine designed to project pictures in a well-known manner, but it is to be understood that the device could be used equally well with a camera as with a moving picture projector and it is desired that it shall be understood that where the expression moving picture machine is inserted, a moving picture machine, camera, or other similar device is intended to be covered.

Having thus described my invention I claim as new and desire to secure by Letters Patent:—

1. In an intermittent motion for moving picture machines, an intermittent wheel formed with a plurality of pins projecting from the face thereof, and a cam wheel having a substantially annular groove adapted to successively receive said pins for moving the same a predetermined distance on each rotation of the cam wheel.

2. In an intermittent motion for moving picture machines, a pin wheel formed with a plurality of pins, and a cam for engaging said pins successively and moving the same a predetermined distance on each engagement, said cam comprising a body portion having a substantially annular groove diverging into inclined radial ways, said ways substantially meeting at the periphery of the wheel, whereby said groove is substantially continuous and upon the rotation of said cam said pins will successively enter one of said ways and will remain in said groove until the cam has been completely rotated, whereupon the pins will be forced out of the remaining radial way.

3. In an intermittent motion for moving picture machines, the combination of a pin wheel, and a continuously operating cam for engaging and moving the pins on said pin wheel, said cam being formed with a substantially annular groove merging into beveled ways whereby cam faces are formed, said cam faces being adapted to engage said pins successively for moving said pins into said annular groove whereby upon a complete revolution of said cam wheel said pin wheel will be stepped forward the distance of the space between adjacent pins.

4. In an intermittent motion for moving picture machines, a pin wheel provided with a plurality of pins, a cam wheel formed with an annular groove merging into tangentially arranged grooves extending to the surface of the wheel at adjacent points, whereby an entrance and an exit opening is provided for said annular groove, the surface of said cam wheel being chamfered off upon each side of each of the tangentially arranged grooves, whereby said pins may be forced one at a time into said annular groove, the remaining pin positively being held out of said annular groove.

5. In an intermittent motion for moving picture machines, the combination of a rotatable disk, a plurality of pins extending from the face of said disk and a cam wheel co-acting with said pins for moving the same in order to give said disk an intermittent motion, said cam wheel being provided on one face with a substantially annular groove and a pair of inclined grooves radiating from said annular groove whereby opposing cam faces are provided adapted to engage said pins upon the rotation of the cam wheel, one cam face engaging the pins when the cam wheel is moved in one direction, and the opposite cam face engaging said pins when the cam wheel is moved in an opposite direction.

6. In an intermittent drive for moving picture machines, the combination of a rotatable disk, a plurality of pins arranged on the face of said disk, a cam wheel co-acting with said pins for moving the same in order to give said disk an intermittent motion, said cam wheel being formed with a substantially annular groove and a pair of inclined radially positioned grooves merging into said annular groove whereby said pins are successively accommodated in the face of said cam wheel and are successively moved step by step in a rotary direction, the cam wheel at the point where said radially positioned grooves merge into the periphery being beveled for causing the cam surface of said radially positioned grooves to properly engage said pins.

In testimony whereof I have signed my name to this specification in the presence of two subscribing witnesses.

JOHN C. COLLINS.

Witnesses:
  A. L. KITCHIN,
  PHILIP D. ROLLHAUS.